(12) United States Patent
Geiger et al.

(10) Patent No.: US 11,718,203 B2
(45) Date of Patent: *Aug. 8, 2023

(54) SYSTEM AND METHOD FOR REDUCING MOTION SICKNESS SYMPTOMS

(71) Applicant: Bayerische Motoren Werke Aktiengesellschaft, Munich (DE)

(72) Inventors: Christian Geiger, Kochel am See (DE); Marc Mutzl, Munich (DE); Alexander Spangler, Laaber (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 542 days.

This patent is subject to a terminal disclaimer.

(21) Appl. No.: 16/955,530

(22) PCT Filed: Oct. 1, 2018

(86) PCT No.: PCT/DE2018/100823
§ 371 (c)(1),
(2) Date: Jun. 18, 2020

(87) PCT Pub. No.: WO2019/120360
PCT Pub. Date: Jun. 27, 2019

(65) Prior Publication Data
US 2021/0009009 A1    Jan. 14, 2021

(30) Foreign Application Priority Data

Dec. 21, 2017 (DE) .................... 10 2017 223 610.8

(51) Int. Cl.
*B60N 2/02* (2006.01)
*B60N 2/50* (2006.01)
(Continued)

(52) U.S. Cl.
CPC ......... *B60N 2/0244* (2013.01); *B60G 17/016* (2013.01); *B60N 2/4207* (2013.01); *B60N 2/501* (2013.01); *B60N 2002/0268* (2013.01)

(58) Field of Classification Search
CPC .... B60N 2/0244; B60N 2/4207; B60N 2/501; B60N 2002/0268; B60G 17/016
See application file for complete search history.

(56) References Cited

U.S. PATENT DOCUMENTS

| 2006/0095180 A1 | 5/2006 | Ummethala et al. |
| 2006/0200287 A1 | 9/2006 | Parison et al. |

(Continued)

FOREIGN PATENT DOCUMENTS

| CN | 101497321 A | 8/2009 |
| CN | 104554095 A | 4/2015 |

(Continued)

OTHER PUBLICATIONS

Chinese-language Office Action issued in Chinese Application No. 201880071887.X dated Apr. 20, 2022 with English translation (21 pages).

(Continued)

*Primary Examiner* — Yuen Wong
(74) *Attorney, Agent, or Firm* — Crowell & Moring LLP (57) ABSTRACT

A system reduces motion sickness symptoms in operation of a vehicle. The system has a control unit which is coupled to a sensor system and/or to a navigation system, to a vehicle seat system, to a vehicle stabilization device and to a display unit for receiving and/or emitting signals. The sensor system and the navigation system are set up to receive environmental data and/or vehicle component data relating to the vehicle, from which movements of the vehicle result, and to transfer the data to the control unit. The control unit is set up to generate vehicle stabilization signals, seat adjustment (Continued)

signals and display signals on the basis of the received environmental data and/or vehicle component data.

15 Claims, 3 Drawing Sheets

(51) Int. Cl.
*B60N 2/42* (2006.01)
*B60G 17/016* (2006.01)

(56) References Cited

U.S. PATENT DOCUMENTS

| | | |
|---|---|---|
| 2011/0109462 A1 | 5/2011 | Deng et al. |
| 2013/0006478 A1 | 1/2013 | Lin |
| 2015/0120149 A1 | 4/2015 | Worrel et al. |
| 2016/0167672 A1 | 6/2016 | Krueger |
| 2016/0318395 A1 | 11/2016 | Cofer et al. |
| 2017/0136842 A1* | 5/2017 | Anderson ............ B60N 2/0244 |
| 2017/0253254 A1 | 9/2017 | Sweeney et al. |
| 2017/0267253 A1 | 9/2017 | Schmidt et al. |
| 2017/0313326 A1 | 11/2017 | Sweeney et al. |
| 2018/0072189 A1 | 3/2018 | Plante et al. |
| 2018/0178690 A1 | 6/2018 | Castillo et al. |
| 2018/0281623 A1 | 10/2018 | Matsumoto et al. |
| 2020/0120871 A1 | 4/2020 | Woodrum |
| 2022/0017109 A1* | 1/2022 | Hwang ................. B60Q 1/507 |

FOREIGN PATENT DOCUMENTS

| | | |
|---|---|---|
| CN | 107215296 A | 9/2017 |
| DE | 197 30 366 A1 | 1/1999 |
| DE | 101 56 219 C1 | 8/2003 |
| DE | 10 2007 000 182 A1 | 10/2007 |
| DE | 10 2012 023 931 A1 | 6/2014 |
| DE | 10 2014 221 337 A1 | 4/2015 |
| DE | 10 2015 011 708 A1 | 5/2016 |
| DE | 10 2015 015 306 A1 | 5/2016 |
| DE | 10 2016 009 137 A1 | 2/2017 |
| ES | 2 226 584 A1 | 3/2005 |
| WO | WO 2016/188545 A1 | 12/2016 |
| WO | WO 2016/197068 A1 | 12/2016 |

OTHER PUBLICATIONS

International Search Report (PCT/ISA/210) issued in PCT Application No. PCT/DE2018/100823 dated Jan. 8, 2019 with English translation (five (5) pages).
German-language Written Opinion (PCT/ISA/237) issued in PCT Application No. PCT/DE2018/100823 dated Jan. 8, 2019 (seven (7) pages).
German-language Search Report issued in German Application No. 10 2017 223 610.8 dated Sep. 21, 2018 with partial English translation (15 pages).
International Search Report (PCT/ISA/210) issued in PCT Application No. PCT/DE2018/101014 dated Apr. 12, 2019 with English translation (six (6) pages).
German-language Written Opinion (PCT/ISA/237) issued in PCT Application No. PCT/DE2018/101014 dated Apr. 12, 2019 (six (6) pages).
German-language Search Report issued in German Application No. 10 2017 223 609.4 dated Apr. 13, 2018 with partial English translation (12 pages).
United States Non-Final Office Action issued in U.S. Appl. No. 16/955,544 dated Sep. 9, 2022 (19 pages).
United States Final Office Action issued in U.S. Appl. No. 16/955,544 dated Dec. 28, 2022 (13 pages).
Chinese-language Office Action issued in Chinese Application No. 201880076449.2 dated Nov. 17, 2021 (17 pages).

* cited by examiner

SYSTEM AND METHOD FOR REDUCING MOTION SICKNESS SYMPTOMS

BACKGROUND AND SUMMARY OF THE INVENTION

The invention relates to a system and method for reducing motion sickness symptoms.

Methods that are applied in order to avoid motion sickness during a drive are already known from the prior art. DE 101 56 219 C1 discloses a method in which the passenger is shown images during the journey depending on journey-specific movement data, and the visual impression of the observed images is thus correlated with the position and movement values currently being subjectively perceived.

DE 10 2015 011 708 A1 discloses a method in which manual inputs by an occupant (health parameters) are correlated with vehicle parameters and route parameters in order to determine a discomfort threshold in terms of motion sickness-induced illness. In order to counteract the occurrence of motion sickness-induced illness, the vehicle is then air-conditioned, fragranced and/or a seat massage function is activated.

The methods known from the prior art record the risk of motion sickness-induced illness in a passenger and recommend or initiate countermeasures in order to avoid the occurrence of motion sickness in the passenger. However, these methods do not take the position and orientation of the vehicle seat or of the vehicle occupant himself into consideration. In a self-driving vehicle, it is often the case that one or more occupants are not sitting in the direction of travel, but rather are sitting or lying counter to the direction of travel.

One object of the invention is therefore to provide a system and a method for reducing motion sickness symptoms that at least partly overcomes the disadvantages of the methods known from the prior art.

The object is achieved by the features of the independent patent claims. Advantageous embodiments are described in the dependent claims. It is pointed out that additional features of a patent claim dependent on an independent patent claim, without the features of the independent patent claim or in combination only with a subset of the features of the independent patent claim, may form a separate invention independent of the combination of all of the features of the independent patent claim that may be made into the subject matter of an independent claim, of a divisional application or of a subsequent application. This applies analogously to the technical teaching described in the description, which teaching may form an invention independent of the features of the independent patent claims.

A first aspect of the invention relates to a system for reducing motion sickness symptoms for a vehicle, wherein the system has a control unit that is coupled to a sensor system and/or to a navigation system, to a vehicle seat system, to a vehicle stabilization apparatus and to a display unit in order to receive and/or emit signals.

The term "motion sickness" is understood to mean an illness caused by the influence of movements on the human body. Motion sickness is usually also referred to as travel sickness and usually called seasickness, airsickness or space sickness depending on where the movement takes place. Motion sickness is caused by movement and in particular by repeated acceleration procedures with changing acceleration values and acceleration directions. Motion sickness symptoms comprise nausea, vomiting, dizziness, paleness, a drop in blood pressure, palpitations, outbreaks of sweating and hyperventilation.

A vehicle within the meaning of the present document should be understood to mean any vehicle by way of which people and/or goods are able to be moved. Possible examples of a vehicle are: motor vehicle, truck, land vehicles, buses, driver's cabins, cable cars, elevator cars, rail vehicles, watercraft (for example ships, boats, submarines, diving bells, hovercraft, hydrofoils), aircraft (aeroplanes, helicopters, ground effect vehicles, airships, balloons). The vehicle is preferably a motor vehicle. A motor vehicle in this sense is a land vehicle that is moved by mechanical force without being linked to rails. A motor vehicle in this sense comprises a motor car, a motorcycle and a traction unit.

The control unit is a unit that receives information, for example in the form of signals and/or data, from a device, processes it and provides it to a further device or prompts the further device to perform a certain action. For this purpose, the control unit is coupled in terms of communication to one or more devices, such as for example to the sensor system, the navigation system, the vehicle seat system, the vehicle stabilization apparatus and/or the display unit, that is to say so as to receive and/or emit signals. The coupling (in terms of communication) may be wireless (for example Bluetooth, WLAN, mobile radio) or wired (for example by way of a USB interface, data cable, etc.). Even if the control unit is described as a unit, then this should also be understood to mean a control unit that has a plurality of parts. For example, the term "control unit" also includes the situation in which individual control functions are distributed to other devices mentioned in this document. This could be the case for example when the function of generating the seat adjustment signals is performed in the vehicle seat system itself. In other words, parts of the control unit may be distributed to devices, such as for example the sensor system, the navigation system, the vehicle seat system, the vehicle stabilization apparatus and/or the display unit.

The control unit and/or the sensor system and/or the navigation system or one or more components thereof may be a device in the vehicle. In addition or as an alternative thereto, it may be an external device, for example a stationary device and/or a mobile terminal.

The sensor system and the navigation system are configured so as to receive surroundings data of the vehicle and transmit them to the control unit. Surroundings data of the vehicle mean data that relate to the surroundings of the vehicle. Such surroundings data comprise weather data, topology data (in particular topology data about the route to be traveled, such as for example the occurrence of curves, hills and/or traffic lights, the flatness of the roadway or lack of flatness of the roadway), route data, surroundings data (in particular surroundings data determined by the sensor system with the additional assistance of a surroundings model), data about the start and/or destination of a selected route, etc. Surroundings data in particular mean data that have an effect on the vehicle from outside the vehicle. The surroundings data are preferably obtained using highly accurate maps.

The sensor system and the navigation system are furthermore configured so as to receive vehicle component data of the vehicle, from which movements of the vehicle result, and to transmit them to the control unit. Such vehicle component data comprise data about engine components, chassis components (brake system, suspension, damping system, steering system, wheel suspension, wheels, tires, etc.), bodywork components, force transmission components (for example transmission, shaft, clutch, etc.). The movements of the vehicle, which result from the movement of the vehicle components, comprise translational and rotational movements in the direction of the vehicle longitudinal axis, vehicle transverse axis and vehicle height axis.

The sensor system comprises at least one of the following apparatuses: ultrasound sensor, radar sensor (for example short-range radar sensor, long-range radar sensor), lidar sensor, video system and/or image sensor (for example camera). The data of the sensor system may stem from one of the abovementioned apparatuses or from a combination of a plurality of the abovementioned apparatuses (sensor data fusion).

A navigation system within the meaning of the present document should be understood to mean a system that makes it possible to create a route and guidance to a selected destination through position determination (for example GPS, GLONASS, Galileo, Beidou, etc.) and/or geographical information (topology maps, road maps, air maps or sea maps).

The surroundings data may be received by the sensor system and/or the navigation system and transmitted to the control unit. The vehicle component data may likewise be received by the sensor system and/or the navigation system and transmitted to the control unit.

The vehicle seat system is configured so as to receive seat adjustment signals from the control unit and to adjust at least one vehicle seat of the vehicle in accordance with the received seat adjustment signals.

A vehicle seat system within the meaning of the present document comprises at least one vehicle seat that is suitable for accommodating a seated vehicle occupant. The term vehicle occupant in the present document should be understood to mean both the driver and a passenger who is not driving himself.

The vehicle seat system furthermore comprises an adjustment apparatus by way of which the at least one vehicle seat is able to be adjusted. In order to adjust the at least one vehicle seat, the vehicle seat system, in particular the adjustment apparatus of the vehicle seat system, receives seat adjustment signals from the control unit. The adjustment apparatus of the vehicle seat system may comprise seat rails for moving a vehicle seat, an adjustment device for adjusting the seat incline and/or seat height and/or a lordosis support.

The vehicle stabilization apparatus is configured so as to receive vehicle stabilization signals from the control unit and to adjust at least one vehicle component of the vehicle in accordance with the received vehicle stabilization signals.

The vehicle stabilization apparatus within the meaning of the present document should be understood to mean an apparatus by way of which the vehicle is able to be stabilized. In order to stabilize the vehicle, stabilizing moments and/or damping or elastic forces are built up as required, which then act on the vehicle. By virtue of the stabilizing moments and/or damping forces and/or elastic forces that are applied, it is possible to reduce or eliminate the rolling movements and/or vibrating movements of the vehicle.

The vehicle stabilization apparatus receives vehicle stabilization signals from the control unit and adjusts at least one vehicle component of the vehicle in accordance with the received vehicle stabilization signals. The adjustable vehicle components comprise engine components, chassis components (brake system, suspension, damping system, steering system, wheel suspension, wheels, tires, etc.), bodywork components, force transmission components (for example transmission, shaft, clutch, etc.).

The display unit is configured so as to receive display signals from the control unit and to display them. The display unit may have one or more display devices, wherein the display signals are displayed acoustically, optically or haptically.

The display unit may have one or more existing display devices and/or one or more separate display devices. Exemplary implementations of such display devices may be a display means of the dashboard, a display (for example in the cockpit area and/or on the rear part of a vehicle seat and/or on the interior lining of the vehicle and/or hovering freely in the interior of the vehicle), a head-up display (for example in one or more of the windows of the vehicle), an infotainment system, an on-board computer, a communication unit, a combined instrument, a mobile terminal, etc.

A mobile terminal is a device that is able to communicate wirelessly in a mobile network via local area networks (LANs), such as for example Wireless Fidelity (Wi-Fi), or via wide area networks (WANs) such as for example Global System for Mobile Communication (GSM), General Packpage Radio Service (GPRS), Enhanced Data Rates for Global Evolution (EDGE), Universal Mobile Telecommunications System (UMTS), High Speed Downlink/Uplink Packet Access (HSDPA, HSUPA), Long Term Evolution (LTE), or World Wide Interoperability for Microwave Access (WIMAX). Communication using other current or future communication technologies is possible. The term mobile terminal in particular contains smartphones, but also other mobile telephones, personal digital assistants (PDAs), Tablet PCs and all current and future electronic devices that are equipped with technology for loading and executing apps. The mobile terminal may be coupled to the vehicle via an appropriate communication interface, for example a Bluetooth interface. As an alternative thereto, an app on the mobile terminal may be linked to the vehicle by way of a suitable authentication method via a server. All current and future authentication methods such as knowledge (for example username and password, PIN, security question, etc.), possession (for example SIM card, certificate, smartcard), biometrics (for example fingerprint, facial recognition) and any combination of the individual authentication methods come into consideration as authentication.

The control unit is configured so as to generate vehicle stabilization signals, seat adjustment signals and display signals depending on the received surroundings data and/or vehicle component data.

Generating the vehicle stabilization signals comprises the following actions: determining first forces acting on vehicle components due to the movements of the vehicle using the surroundings data and/or vehicle component data; and determining vehicle stabilization signals that are designed such that they bring about second forces that counteract the first forces after adjusting the at least one vehicle component of the vehicle in accordance with these vehicle stabilization signals.

The movements of the vehicle, caused by the circumstances in the surroundings and/or the movements of the vehicle components, are able to be determined using the surroundings data and/or vehicle component data. The forces (first forces) acting on the individual vehicle components are in turn able to be determined using the determined movements of the vehicle. The surroundings data may be used, for example for upcoming bumpy ground, to calculate the movements of the vehicle, and thus the forces acting on the corresponding vehicle components, caused by driving over the bumpy ground. For example, the forces acting on the passenger compartment due to driving over bumpy ground may be calculated.

After the forces (first forces) acting on the individual vehicle components have been determined, second forces that counteract the first forces are determined. Vehicle stabilization signals may be determined according to these second forces. The vehicle stabilization signals are thus selected such that, after they have been applied to the individual vehicle components, the acting forces are reduced or are no longer present. In the abovementioned example, it is possible to determine vehicle stabilization signals that exert forces on the respective vehicle components that counteract the forces acting on the passenger compartment due to driving over bumpy ground. If the vehicle stabilization signals are applied to the respective vehicle components at the time of driving over the bumpy ground, that is to say if the respective vehicle components are adjusted in accordance with the vehicle stabilization signals, a vehicle occupant in the vehicle does not experience the forces arising due to driving over the bumpy ground.

Generating the seat adjustment signals comprises the following actions: determining first acceleration forces that would act on a vehicle occupant sitting in the direction of travel due to the movements of the vehicle using the surroundings data and/or vehicle component data; and determining seat adjustment signals that are designed such that they bring about second acceleration forces for a vehicle occupant after adjusting the vehicle seat in accordance with these seat adjustment signals such that the first acceleration forces act in an absolute manner on the vehicle occupant, independently of the orientation of the vehicle seat on which the vehicle occupant is sitting.

In order to generate the seat adjustment signals, the movements of the vehicle, caused by the surroundings of the vehicle (for example bumpy ground) and/or by the movement of vehicle components (for example shaking of the passenger compartment), and thus the acceleration forces acting on a vehicle occupant sitting in the direction of travel, are thus first of all determined. In order to calculate the acceleration forces, it is thus assumed that the vehicle is moving without the application of vehicle stabilization signals. In other words, the acceleration forces are calculated as if no vehicle-stabilizing moments or the like are applied to the vehicle. After the acceleration forces that would act on a vehicle occupant sitting in the direction of travel have been determined, acceleration forces that have to act on the vehicle occupant such that said vehicle occupant experiences real acceleration forces, allowing him to experience the movements of the vehicle as if he were sitting in the vehicle seat in the direction of travel, are calculated depending on the orientation of the vehicle seat, and thus the orientation of the vehicle occupant. By way of example, acceleration forces (second acceleration forces) that have to act on a vehicle occupant sitting in the opposite direction to the direction of travel such that said vehicle occupant experiences the backwards direction of travel as if he were sitting in the direction of travel due to the absolute acceleration forces acting on him are calculated. The seat adjustment signals are determined on the basis of the calculated second acceleration forces.

Generating the display signals comprises the following action: determining display signals that are designed such that they bring about a sensory perception, congruent with the first acceleration forces, for the vehicle occupant on the vehicle seat adjusted in accordance with the seat adjustment signals.

A sensory perception within the meaning of the present document comprises at least one of the following: visual perception, auditive perception, sensitivity (in particular tactile perception), olfactory perception and gustatory perception.

If for example a vehicle occupant is sitting on a vehicle seat directed counter to the direction of travel, the vehicle seat is adjusted by way of the seat adjustment signals such that the vehicle occupant feels as though he would experience the journey in the direction of travel. In other words, the vehicle seat is adjusted such that the vehicle occupant experiences acceleration forces that correspond to the acceleration forces that he would experience in a vehicle seat oriented in the direction of travel. In a manner matching these acceleration forces actually acting on the vehicle occupant (first acceleration forces), the vehicle occupant is shown elements that cause a sensory perception for the vehicle occupant that corresponds to the acceleration forces that are actually acting. For example, the vehicle occupant is shown a video on a display, which video reflects the view outside the vehicle for a vehicle occupant sitting in the direction of travel.

By way of the system or method described in the present document for reducing motion sickness symptoms, any vehicle occupant is able to be put in a position to experience a journey in a vehicle as though the vehicle occupant were sitting in the direction of travel. As a result, contradictory signals from the eyes, balance organs and articular receptors are avoided, and typical symptoms of travel sickness (motion sickness) are able to be reduced or eliminated.

The sensor system and the navigation system are advantageously furthermore configured so as to receive surroundings data and/or vehicle component data of the vehicle, from which movements of the vehicle result, and/or to transmit them to the control unit, only when the vehicle is at least in a partly automated driving mode, preferably at least in a highly automated driving mode and even more preferably in a fully automated driving mode.

As an alternative or in addition thereto, the control unit is advantageously furthermore configured so as to generate vehicle stabilization signals, seat adjustment signals and display signals only when the vehicle is at least in a partly automated driving mode, preferably at least in a highly automated driving mode and even more preferably in a fully automated driving mode.

The automated driving modes mentioned in this document (partly automated driving mode, highly automated driving mode and fully automated or autonomous driving mode) correspond to the degrees of automation defined by the German Federal Highway Research Institute (BASt) (see BASt publication "Forschung kompakt" [Compact research], issued November 2012). In the case of partly automated driving (TAF), the system takes over the longitudinal and transverse guidance for a certain duration and/or in specific situations, wherein the driver has to continuously monitor the system. In the case of highly automated driving (HAF), the system takes over the longitudinal and transverse guidance for a certain duration without the driver having to continuously monitor the system; the driver must however be capable within a certain time of taking over vehicle guidance. In the case of fully automated (autonomous) driving (VAF), the system is able to automatically manage driving in all situations for a specific application case; a driver is then no longer required for this application case. The degrees of automation mentioned above in accordance with the definition of the BASt correspond to SAE Levels 2 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required. The "fully automated" degree of automation is intended to jointly incorporate the case of driverless driving in the present document.

According to one embodiment, the control unit is furthermore configured so as to generate the seat adjustment signals only for a vehicle seat whose orientation deviates from the direction of travel of the vehicle; in addition or as an alternative thereto, the vehicle seat system is furthermore configured so as to receive seat adjustment signals from the control unit only for a vehicle seat whose orientation deviates from the direction of travel of the vehicle; in addition or as an alternative thereto, the vehicle seat system is furthermore configured so as to adjust only a vehicle seat whose orientation deviates from the direction of travel of the vehicle in accordance with the received seat adjustment signals.

As a result, only vehicle seats that are not oriented in the direction of travel are adjusted. The vehicle seat of a vehicle occupant sitting on the vehicle seat that is in the direction of travel in any case is accordingly not adjusted.

By virtue of the combination of adjusted seat, adjusted vehicle components and specific display signals, the vehicle occupant or the vehicle occupants continuously get the feeling of being in a position in the direction of travel. Motion sickness is thus avoided, since the movement of the vehicle matches the movement of the body and displayed display signals.

As an alternative or in addition thereto, the control unit is furthermore advantageously configured so as to generate the seat adjustment signals only when the vehicle is at least in a partly automated driving mode, preferably at least in a highly automated driving mode and even more preferably in a fully automated driving mode.

As an alternative or in addition thereto, the vehicle seat system is furthermore advantageously configured so as to receive seat adjustment signals from the control unit only when the vehicle is at least in a partly automated driving mode, preferably at least in a highly automated driving mode and even more preferably in a fully automated driving mode.

According to one embodiment, the display unit is designed such that the displayed display signals are visible only to one vehicle occupant or a particular subset of the vehicle occupants.

The display signals are preferably displayed so as to be visible only to the vehicle occupant or vehicle occupants on vehicle seats that are not oriented in the direction of travel.

The display unit may have a plurality of display devices, wherein a display device is assigned to each vehicle occupant. By way of example, each vehicle occupant is assigned a display. The display signals are then displayed only on the display devices that are assigned to those vehicle occupants who are not oriented in the direction of travel on their respective vehicle seat.

As an alternative or in addition, one or more display devices may be equipped with view protection apparatuses (for example view protection films, view protection filters, particular display methods, etc.) in order to make the displayed display signals visible only to one vehicle occupant or a particular subset of the vehicle occupants.

According to a further embodiment, the display unit has one or more display devices, wherein each vehicle occupant is assigned a dedicated display device for displaying the display signals.

By way of example, displays are in each case arranged in the backs of the front vehicle seats and/or side linings for the vehicle occupants in the back of the vehicle.

According to a further embodiment, the display unit has a holographic display device and/or one or more interior fitting elements for displaying the display signals.

A holographic display device is a display device in which a visual display (for example image display) is created by way of holographic methods. The visual display in this case hovers in free space.

By virtue of using a holographic display device, the display of the display signals may be designed so as to be variable in the interior of the vehicle and is not restricted to existing display devices such as displays, interior lining, windows, etc.

The holographic display device may be divided into different regions that are each assigned to one vehicle occupant or a particular subset of the vehicle occupants. In this case, the different regions are displayed such that they are visible only to the respective one vehicle occupant or the particular subset of the vehicle occupants.

Interior fitting elements should be understood to mean all of the components within a vehicle that are visible to vehicle occupants. Examples of interior fitting elements are: front seat or back of the front seat, rear seat or back of the rear seat, door lining, side lining, instrument panel, vehicle roof, sun visor, carpet, central console, parcel shelf, sun blind, steering wheel, interior mirror, etc.

The display unit advantageously has interior fitting elements on which the traffic surrounding the vehicle is displayed. Changes of direction of the vehicle may be displayed on these interior fitting elements. This may be brought about for example by lighting elements (for example LED elements) that change their color as soon as a change of the direction of the vehicle is imminent. Approaching a curve is signaled for example by the LEDs changing color, as a result of which the body is prepared for the upcoming change of movement, and motion sickness is ultimately reduced or avoided.

The interior fitting elements are preferably a particular region of a vehicle ceiling or the entire vehicle ceiling and/or a particular region of a vehicle floor or the entire vehicle floor.

One example of displaying the display signals could be displaying the surrounding traffic on the vehicle floor. As an alternative or in addition thereto, the surrounding traffic could be displayed on the vehicle ceiling and/or vehicle floor by way of LED lights.

According to a further embodiment, the holographic display device hovers in the interior of the vehicle and adopts a substantially spherical shape. Implementing the holographic display device in the form of a sphere (or sphere-like shape) offers the advantage that a single display device is assigned to a plurality of vehicle occupants. As an alternative, each vehicle occupant may be assigned a holographic display device with a substantially spherical shape.

According to one embodiment, the holographic display device is able to be operated by gestures and/or haptic pulses and/or tactile feedback pulses and/or voice commands. The gestures may for example be detected by a camera arranged in the vehicle and possibly evaluated. For this purpose, the camera is advantageously arranged in the ceiling of the vehicle.

According to a further embodiment, the holographic display device has functions of a combined instrument, infotainment system, on-board computer and/or screen; the functions are preferably able to be operated by gestures and/or haptic pulses and/or tactile feedback pulses and/or voice commands.

The term "combined instrument" in the present document is understood to mean an operating unit that comprises displays and/or functions that relate inter alia to the following: tachometer, mileage counter, revolution counter, fuel level display, coolant temperature display, monitoring lights and direction indicators.

The term "infotainment system" in the present document is understood to mean an operating unit that comprises a plurality of functions that relate to information and/or entertainment. Such functions relate to the following devices: car radio, navigation system, hands-free talking apparatus, on-board computer, driving data display, air-conditioning system, driver assistance systems.

The infotainment system and the combined instrument have various interfaces to one or more of the following: one or more controllers, external devices, preferably electronic terminals, storage media, data sources, computer unit.

The holographic display device may be described as a kind of virtual touchscreen. In this case, functions that are normally operated by way of another display unit or communication unit of the vehicle, such as for example the infotainment system, the on-board computer, etc., may be operated by way of the holographic display device. Operation is preferably performed through gesture control, such as for example using finger gestures. The commands made through the gesture control are preferably acknowledged with feedback able to be perceived haptically. As an alternative or in addition, voice commands may be used to operate the functions.

The holographic display device makes it possible to operate (vehicle) functions (for example operating the air-conditioning system/heating system, operating the navigation apparatus, operating the communication apparatus, etc.) using an immaterial operating surface that allows a vehicle occupant and the vehicle to interact visibly and noticeably with one another.

The haptic pulses and/or the tactile feedback pulses may be formed using a field or a plurality of fields of ultrasonic pressure waves. By overlaying the sonic radiation pressure (the pressure difference averaged over time with respect to the normal pressure of the medium when the sonic field is applied to other media) of a plurality of ultrasound sources, areas with an increased pressure that are able to be touched in a manner similar to a real object are able to be generated in three-dimensional space. Holographic displays are thereby able to be felt in the same way as solid objects.

According to a further embodiment, the display signals are arranged in the peripheral visual region of perception of a vehicle occupant or a particular subset of the vehicle occupants. The peripheral visual region of perception is understood to mean a region in which a vehicle occupant or a particular subset of the vehicle occupants are able to perceive the display signals through peripheral vision. The display signals are thus displayed in such a way that a vehicle occupant or a particular subset of the vehicle occupants are able to perceive the display signals while he or they are occupied with another task (for example reading). In other words, the display signals are perceptible even though the vehicle occupant or the particular subset of the vehicle occupants are not focused on the visual perception of the display signals.

According to a further embodiment, the display signals comprise perception elements that are obtained at least in part from the surroundings data, wherein the perception elements reflect the surroundings, external to the vehicle, around the vehicle from the view of a vehicle occupant. The perception elements may be recordings, in particular real-time recordings, of a camera or a plurality of cameras and/or be artificially generated images. The camera recordings, in particular real-time camera recordings, may be generated for example by a camera fastened in the interior of the vehicle and that looks out of the vehicle in the direction of travel. As an alternative or in addition thereto, surroundings data that are generated for example by a surroundings sensor system may be processed into image data (artificially generated images) that are able to be displayed on the display unit.

According to a further embodiment, when adjusting a vehicle seat, the display of the display signals is changed such that the display signals are arranged in the field of view of the vehicle occupant on the adjusted vehicle seat. The field of view of the vehicle occupant is understood to mean a region in which visual perception is possible without the additional assistance of eye movements. The display of the display signals may be changed through a movement (for example displacement) of the display unit, in particular a movement of the one or more display devices. As an alternative or in addition thereto, the position of the display signals may be changed on the display unit, in particular on the one or more display devices.

According to a further embodiment, the surroundings data and vehicle component data comprise only data from which movements of the vehicle that substantially do not run along the vehicle height axis result. In other words, the surroundings data and vehicle component data comprise data from which movements of the vehicle result substantially along the vehicle longitudinal axis and substantially along the vehicle transverse axis, rolling movements (rotational movements about the vehicle longitudinal axis), pitching movements (rotational movements about the vehicle transverse axis) and yaw movements (rotational movements around the vehicle height axis).

If such surroundings data and vehicle component data that relate to all of the movements of the vehicle other than the movements of the vehicle that run substantially along the vehicle height axis are used to generate the vehicle stabilization signals, movements of the vehicle along the vehicle height axis are not counteracted by the vehicle stabilization apparatus and the vehicle occupants experience the acceleration forces arising due to the movement substantially along the vehicle height axis. If a vehicle thus travels over bumpy ground, the vehicle stabilization apparatus would not apply any stabilizing moments to vehicle components that bring about forces substantially along the vehicle height axis.

According to a further embodiment, the second forces are large enough that the first forces and the second forces cancel one another out. Due to the fact that the first forces and the second forces cancel one another out, a vehicle occupant does not experience the first forces that are actually acting.

A second aspect of the invention relates to a method for reducing motion sickness symptoms, wherein the method comprises: receiving surroundings data and/or vehicle component data of a vehicle from which movements of the vehicle result. Generating vehicle stabilization signals, seat adjustment signals and display signals depending on the received surroundings data and/or vehicle component data. Adjusting at least one vehicle seat of the vehicle in accordance with the seat adjustment signals. Adjusting at least one vehicle component of the vehicle in accordance with the received vehicle stabilization signals. Displaying the display signals. Generating the vehicle stabilization signals comprises Generating the vehicle stabilization signals comprises the following actions: determining first forces acting on vehicle components due to the movements of the vehicle using the surroundings data and/or vehicle component data; and determining vehicle stabilization signals that are designed such that they bring about second forces that counteract the first forces after adjusting the at least one vehicle component of the vehicle in accordance with these vehicle stabilization signals.

Generating the seat adjustment signals comprises the following actions: determining first acceleration forces that would act on a vehicle occupant sitting in the direction of travel due to the movements of the vehicle using the surroundings data and/or vehicle component data; and determining seat adjustment signals that are designed such that they bring about second acceleration forces for a vehicle occupant after adjusting the vehicle seat in accordance with these seat adjustment signals such that the first acceleration forces act in an absolute manner on the vehicle occupant, independently of the orientation of the vehicle seat on which the vehicle occupant is sitting.

Generating the display signals comprises the following action: determining display signals that are designed such that they bring about a sensory perception, congruent with the first acceleration forces, for the vehicle occupant on the vehicle seat adjusted in accordance with the seat adjustment signals.

According to one embodiment, the seat adjustment signals are generated only for a vehicle seat whose orientation deviates from the direction of travel of the vehicle and/or only a vehicle seat whose orientation deviates from the direction of travel of the vehicle is adjusted in accordance with the received seat adjustment signals.

According to one embodiment, the displayed display signals are visible only to one vehicle occupant or a particular subset of the vehicle occupants.

According to one embodiment, the display signals are received and displayed by a display unit, wherein the display unit has one or more display devices, and wherein each vehicle occupant is assigned a dedicated display device for displaying the display signals.

According to one embodiment, the display signals are displayed on a holographic display device. The display signals are in particular received and displayed by a display unit, wherein the display unit has a holographic display device and/or one or more interior fitting elements for displaying the display signals.

According to one embodiment, the holographic display device hovers in the interior of the vehicle and adopts a substantially spherical shape.

According to one embodiment, the holographic display device is able to be operated by gestures and/or haptic pulses and/or tactile feedback pulses and/or voice commands.

According to one embodiment, the holographic display device has functions of a combined instrument, infotainment system, on-board computer and/or screen that are preferably able to be operated by gestures and/or haptic pulses and/or tactile feedback pulses and/or voice commands.

According to one embodiment, the display signals are displayed in the peripheral visual region of perception of a vehicle occupant or a particular subset of the vehicle occupants.

According to one embodiment, the display signals comprise perception elements that are obtained at least in part from the surroundings data, wherein the perception elements reflect the surroundings, external to the vehicle, around the vehicle from the view of a vehicle occupant.

According to a further embodiment, when a vehicle seat is adjusted, the display of the display signals is changed such that the display signals are arranged in the field of view of the vehicle occupant on the adjusted vehicle seat.

According to a further embodiment, the surroundings data and vehicle component data comprise only data from which movements of the vehicle that substantially do not run along the vehicle height axis result.

According to a further embodiment, the second forces are large enough that the first forces and the second forces cancel one another out.

The above explanations regarding the system according to the invention for reducing motion sickness symptoms according to the first aspect of the invention also apply analogously to the method according to the invention for reducing motion sickness symptoms according to the second aspect of the invention; advantageous exemplary embodiments of the method according to the invention correspond to the described advantageous exemplary embodiments of the system according to the invention. Advantageous exemplary embodiments of the method according to the invention that are not described explicitly at this point correspond to the described advantageous exemplary embodiments of the system according to the invention.

According to one embodiment, a vehicle is equipped with an above-described system for reducing motion sickness symptoms.

The invention is described below with reference to exemplary embodiments, with the additional assistance of the attached drawings.

DETAILED DESCRIPTION OF THE DRAWINGS

Figure 1:
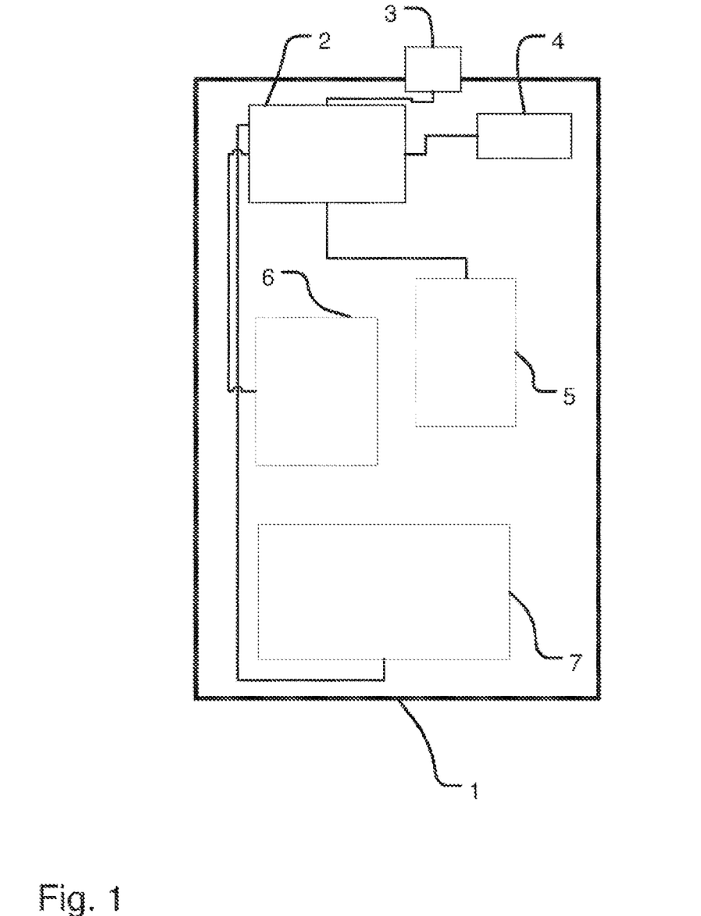
FIG. 1 schematically shows a system for reducing motion sickness symptoms.

FIG. 1 shows a system for reducing motion sickness symptoms. The system is provided for a vehicle 1. Even though the system is illustrated together with a vehicle 1 in FIG. 1, this is not intended to mean that the system is always connected to a vehicle 1, but rather to explain merely by way of example that the system may be provided for a vehicle 1.

The system has a control unit 2 that is coupled to a surroundings sensor system 3, to a navigation system 4, to a vehicle seat system 5, to a vehicle stabilization apparatus 6 and to a display unit 7 in order to receive and/or emit signals.

Surroundings data, that is to say data that describe the surroundings of the vehicle 1 and/or the surroundings of the route ahead of the vehicle 1, are compiled by way of the surroundings sensor system 3 and/or the navigation system 4 and forwarded to the control unit 2. In this example, the surroundings data describe inter alia the topology of the route ahead, this being obtained for example from a highly accurate map. The surroundings data relevant to the vehicle 1 are determined on the basis of the route planned by the navigation system 4.

Figure 2:
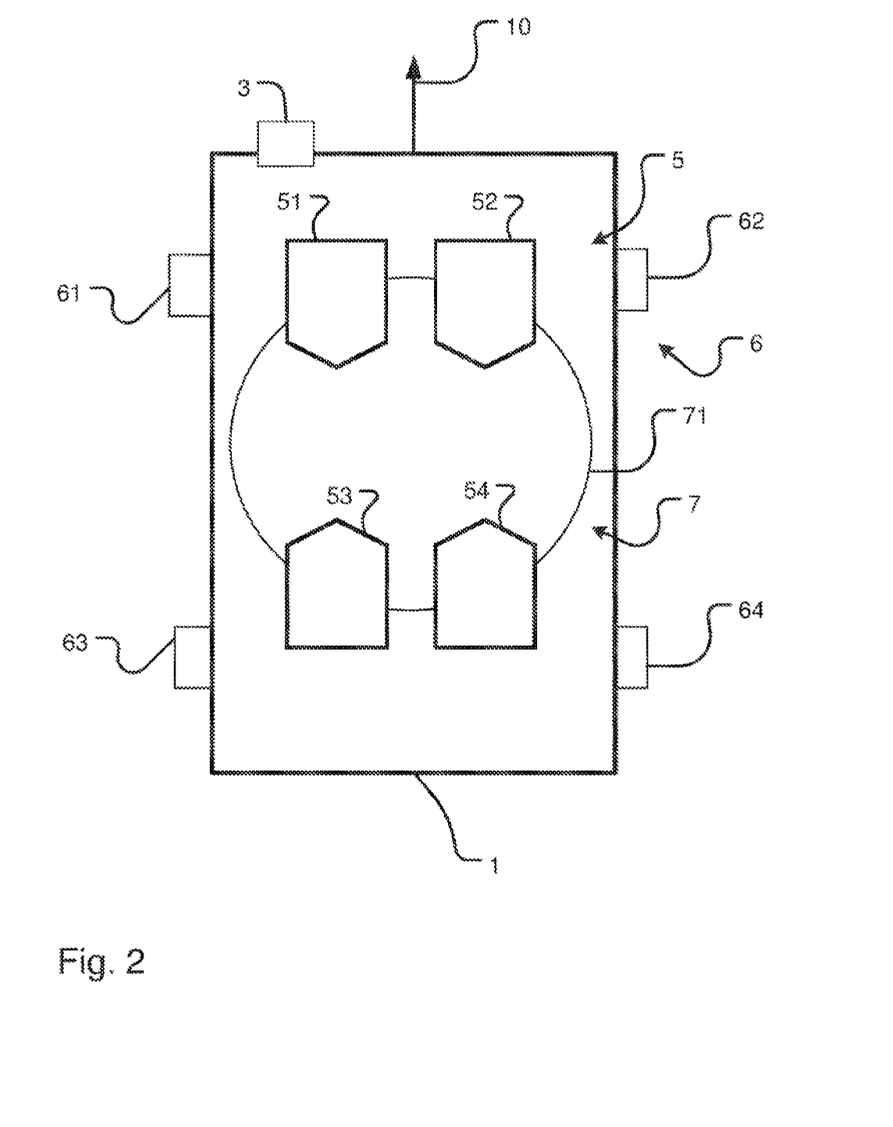
FIG. 2 schematically shows a horizontal section of a vehicle having a system for reducing motion sickness symptoms according to one embodiment.

FIG. 2 schematically shows a horizontal section of a vehicle 1, for example of the vehicle 1 from FIG. 1. The section is selected as though the vehicle roof were cut through. The depicted vehicle has a vehicle stabilization apparatus 6 that comprises suspension/damping elements 61, 62, 63 and 64. The suspension/damping elements 61, 62, 63 and 64 are actuated by vehicle stabilization signals and exert stabilizing moments on the vehicle 1. The vehicle stabilization signals are generated in the control unit 2 (see FIG. 1) on the basis of the surroundings data that are determined inter alia by the navigation system 4 (see FIG. 1). The vehicle stabilization signals are in this case selected such that the movements that the vehicle 1 would experience due to the topology of the route are counteracted by controlling the suspension/damping elements 61, 62, 63 and 64. In the best case scenario, the vehicle stabilization signals are selected such that the expected movements of the vehicle 1 are counteracted such that a vehicle occupant located in the vehicle 1 does not experience any movement whatsoever of the vehicle 1. One example of the vehicle stabilization apparatus 6 is roll stabilization of the vehicle 1 that primarily stabilizes or counteracts the rotational movements about the vehicle longitudinal axis.

The vehicle 1 furthermore has four vehicle seats 51, 52, 53 and 54 that are adjusted by way of vehicle adjustment elements (not depicted). For this purpose, the surroundings data are converted into seat adjustment signals for the respective vehicle seats 51, 52, 53 and 54 in the control unit 2 (see FIG. 1). Vehicle seats 51 and 52 are arranged counter to the direction of travel, whereas vehicle seats 53 and 54 are arranged in the direction of travel. The direction of travel is identified by the reference sign 10. The seat adjustment signals are generated in accordance with the orientation of the respective vehicle seat (in/counter to the direction of travel). The seat adjustment signals are calculated for each vehicle seat 51, 52, 53 and 54 such that a vehicle occupant sitting on the vehicle seat 51, 52, 53 and 54 experiences travel in the vehicle 1 as though he/they were sitting on a vehicle seat in the direction of travel. That is to say, a vehicle occupant sitting counter to the direction of travel 10 experiences the journey as though he/they were sitting in the direction of travel 10 due to the seat adjustments.

The vehicle 1 furthermore has a display unit 7 that has a display 71 located in the floor of the vehicle 1. The control unit 2 calculates display signals based on the surroundings data, the display signals then being displayed on the display 71. In this case, the display signals depict the surroundings of the vehicle 1, for example the surrounding traffic and the surrounding view around the vehicle. As a result, each vehicle occupant sees the surroundings as though he/they were sitting on the vehicle seat in the direction of travel 10. Due to the seat adjustments, each vehicle occupant thus experiences acceleration forces that match travel in the direction of travel 10, and at the same time sees corresponding images on the display 71, such that the visual perception matches the physical experience of the respective vehicle occupant.

Figure 3:
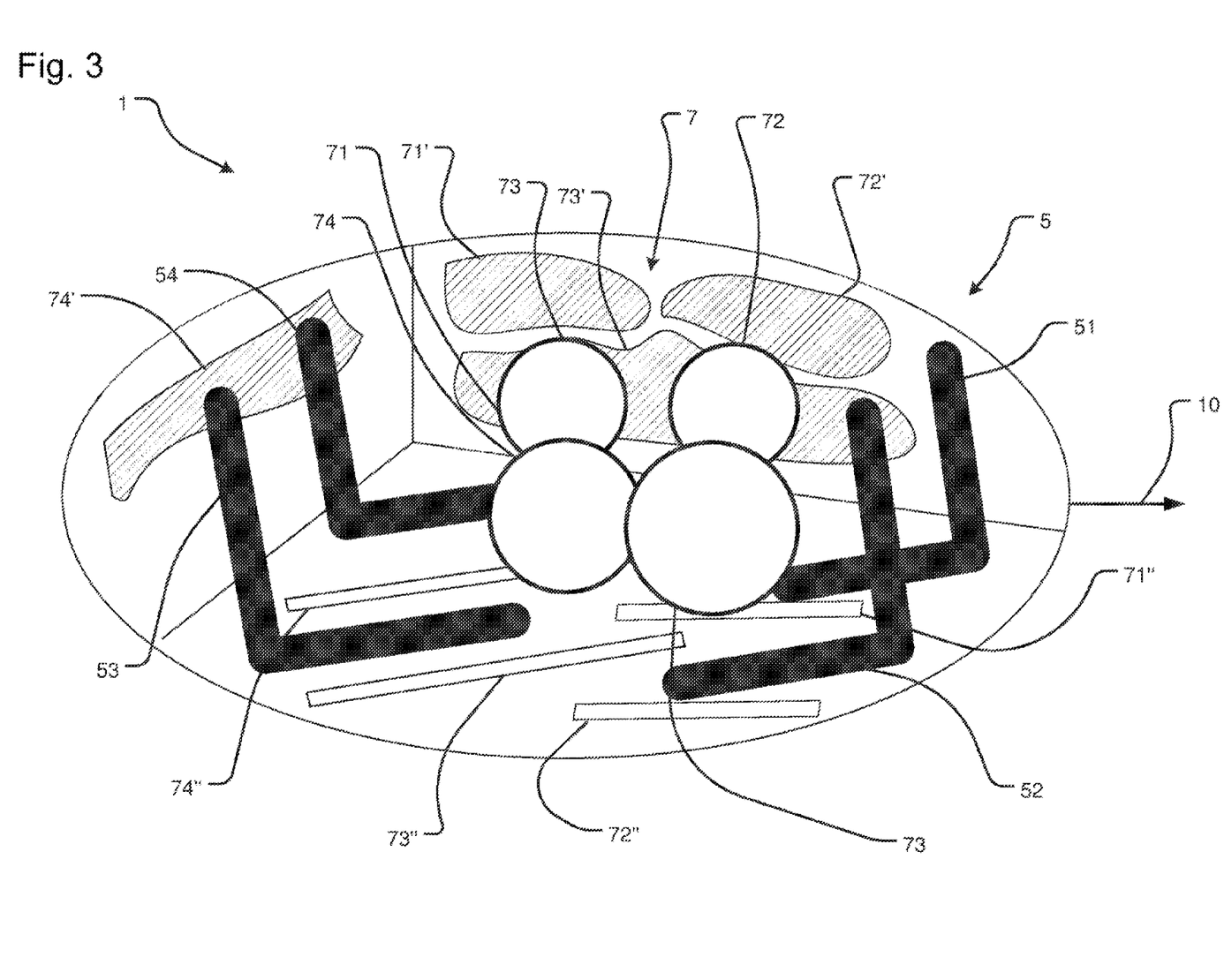
FIG. 3 schematically shows a subregion of a longitudinal section of a vehicle having a system for reducing motion sickness symptoms according to one embodiment.

FIG. 3 schematically shows a subregion of a longitudinal section through a vehicle 1. The vehicle 1 has a system for reducing motion sickness symptoms. As in the exemplary embodiment shown in FIG. 2, the vehicle seat system 5 comprises four vehicle seats 51, 52, 53 and 54, wherein vehicle seats 51 and 52 are arranged counter to the direction of travel 10 and vehicle seats 53 and 54 are arranged in the direction of travel. During an autonomous driving mode, the driver no longer has to be responsible for safely guiding the vehicle, for which reason the vehicle seats may also be arranged counter to the direction of travel.

As already described above in connection with FIGS. 1 and 2, the navigation system 4 (see FIG. 1) and/or the surroundings sensor system 3 determine surroundings data that are processed by the control unit 2 to form vehicle stabilization signals. By applying the vehicle stabilization signals, the movements of the vehicle 1 arising due to the circumstances of the roadway are counteracted. Not only vehicle stabilization signals but also seat adjustment signals for the vehicle seats 51, 52, 53 and 54 are generated on the basis of the surroundings data. By applying the seat adjustment signals to the vehicle seats 51, 52, 53 and 54, the vehicle occupants sitting thereon experience acceleration forces that correspond to movements of the vehicle 1 that would arise due to the circumstances of the roadway.

Display signals corresponding to the acceleration forces actually acting on the vehicle occupants are calculated in the control unit 2 and displayed on the display unit 7. The display unit 7 comprises a plurality of elements, one or more of which may be present in the vehicle: hologram balls 71, 72, 73 and 74 that are each assigned to a vehicle seat 51, 52, 53 and 54 and hover freely in the vehicle interior; interior lining surfaces 71', 72', 73' and 74' onto which the display signals are projected; and LED strips 71", 72", 73" and 74" that are arranged in the vehicle floor and by way of which the display signals are able to be displayed.

Various vehicle functions may be performed using the hologram balls. By way of example, a hologram ball may be used to set the entertainment program in the vehicle and/or the vehicle settings. Traffic details, congestion reports and/or surroundings information may additionally be provided to the vehicle occupants on the hologram balls. The surroundings information relates for example to information about buildings or interesting places along the route. The traffic details may for example contain the current traffic flow and/or surrounding traffic. The surrounding traffic is advantageously displayed from a bird's eye view. In this case, the vehicle is displayed in the middle of a virtual road, wherein other traffic participants moving in the traffic flow with the vehicle are also displayed. The outward view from the vehicle interior is thus displayed to the vehicle occupants. By virtue of the displayed traffic details, congestion reports and/or surroundings information, the vehicle occupants have the feeling of perceiving traffic events around the vehicle and of being an active part thereof. The vehicle occupant is given a safe feeling and continuous control by virtue of the various displayed information.

The hologram balls may also function as displays in order to show content of an external device, such as for example of a laptop, tablet, smartphone, etc. By virtue of gesture control with haptic feedback, each vehicle occupant is able to work actively with the hologram balls and adjust vehicle settings. The gestures are perceived for example by cameras in the ceiling region.

What is claimed is:

1. A system for reducing motion sickness symptoms in operation of a vehicle, comprising:
a sensor system and/or a navigation system;
a vehicle seat system, a vehicle stabilization apparatus, and a display unit; and a control unit comprising a processor and coupled to the sensor system and/or to the navigation system, the control unit being further coupled to the vehicle seat system, to the vehicle stabilization apparatus, and to the display unit, wherein the sensor system and the navigation system are configured so as to receive surroundings data and/or vehicle component data of the vehicle from which movements of the vehicle result and to transmit them to the control unit, the vehicle seat system is configured so as to receive seat adjustment signals from the control unit and to adjust at least one vehicle seat of the vehicle in accordance with the received seat adjustment signals, the vehicle stabilization apparatus is configured so as to receive vehicle stabilization signals from the control unit and to adjust at least one vehicle component of the vehicle in accordance with the received vehicle stabilization signals, the display unit is configured so as to receive display signals from the control unit and to display the received display signals, and the control unit is configured so as to generate vehicle stabilization signals, seat adjustment signals and display signals depending on the received surroundings data and/or vehicle component data, wherein generating the vehicle stabilization signals comprises:

determining first forces acting on vehicle components due to movements of the vehicle using the surroundings data and/or vehicle component data; and determining vehicle stabilization signals that are designed such that the vehicle stabilization signals bring about second forces that counteract the first forces after adjusting the at least one vehicle component of the vehicle in accordance with the vehicle stabilization signals;

wherein generating the seat adjustment signals comprises:

determining first acceleration forces that would act on a vehicle occupant sitting in the direction of travel due to the movements of the vehicle using the surroundings data and/or vehicle component data; and determining seat adjustment signals that are designed such that the seat adjustment signals bring about second acceleration forces for a vehicle occupant after adjusting the vehicle seat in accordance with the seat adjustment signals such that the first acceleration forces act in an absolute manner on the vehicle occupant, independently of an orientation of the vehicle seat on which the vehicle occupant is sitting; and wherein generating the display signals comprises: determining display signals that are designed such that the display signals bring about a sensory perception that corresponds to the first acceleration forces, for the vehicle occupant on the vehicle seat adjusted in accordance with the seat adjustment signals, wherein the sensory perception comprises at least one of visual perception, auditive perception, tactile perception, olfactory perception and gustatory perception.

2. The system according to claim 1, wherein at least one of: the control unit is further configured so as to generate the seat adjustment signals only for a vehicle seat whose orientation deviates from the direction of travel of the vehicle, the vehicle seat system is further configured so as to receive seat adjustment signals from the control unit only for a vehicle seat whose orientation deviates from the direction of travel of the vehicle, and the vehicle seat system is further configured so as to adjust only a vehicle seat whose orientation deviates from the direction of travel of the vehicle in accordance with the received seat adjustment signals.

3. The system according to claim 1, wherein the display unit is configured such that the displayed display signals are visible only to one vehicle occupant or a particular subset of the vehicle occupants.

4. The system according to claim 1, wherein the display unit has one or more display devices and each vehicle occupant is assigned a dedicated display device for displaying the display signals.

5. The system according to claim 1, wherein the display unit has a holographic display device and/or one or more interior fitting elements for displaying the display signals.

6. The system according to claim 5, wherein the holographic display device hovers in the interior of the vehicle and adopts a substantially spherical shape.

7. The system according to claim 5, wherein the holographic display device is able to be operated by gestures, haptic pulses, tactile feedback pulses and/or voice commands.

8. The system according to claim 5, wherein the holographic display device has functions of a combined instrument, infotainment system, on-board computer and/or screen and that are able to be operated by gestures, haptic pulses, tactile feedback pulses and/or voice commands.

9. The system according to claim 1, wherein the display signals are arranged in the peripheral visual region of perception of a vehicle occupant or a particular subset of the vehicle occupants.

10. The system according to claim 9, wherein the display signals comprise perception elements that are obtained at least in part from the surroundings data, and the perception elements reflect the surroundings, external to the vehicle, around the vehicle from the view of a vehicle occupant.

11. The system according to claim 1, wherein when adjusting a vehicle seat, the display of the display signals is changed such that the display signals are arranged in a field of view of the vehicle occupant on the adjusted vehicle seat.

12. The system according to claim 1, wherein the surroundings data and vehicle component data comprise only data from which movements of the vehicle that do not run along a vehicle height axis result.

13. The system according to claim 1, wherein the second forces are large enough that the first forces and the second forces cancel one another out.

14. A vehicle comprising the system for reducing motion sickness symptoms according to claim 1.

15. A method for reducing motion sickness symptoms, the method comprising:

receiving surroundings data and/or vehicle component data of a vehicle from which movements of the vehicle result;

generating vehicle stabilization signals, seat adjustment signals and display signals depending on the received surroundings data and/or vehicle component data;

adjusting at least one vehicle seat of the vehicle in accordance with the seat adjustment signals;

adjusting at least one vehicle component of the vehicle in accordance with the received vehicle stabilization signals; and displaying the display signals; wherein generating the vehicle stabilization signals comprises:

determining first forces acting on vehicle components due to the movements of the vehicle using the surroundings data and/or vehicle component data; and determining vehicle stabilization signals that are designed such that the vehicle stabilization signals bring about second forces that counteract the first forces after adjusting the at least one vehicle component of the vehicle in accordance with the vehicle stabilization signals;

wherein generating the seat adjustment signals comprises:

determining first acceleration forces that would act on a vehicle occupant sitting in the direction of travel due to the movements of the vehicle using the surroundings data and/or vehicle component data; and determining seat adjustment signals that are designed such that the seat adjustment signals bring about second acceleration forces for a vehicle occupant after adjusting the vehicle seat in accordance with the seat adjustment signals such that the first acceleration forces act in an absolute manner on the vehicle occupant, independently of an orientation of the vehicle seat on which the vehicle occupant is sitting; and wherein generating the display signals comprises:

determining display signals that are designed such that the display signals bring about a sensory perception that corresponds to the first acceleration forces, for the vehicle occupant on the vehicle seat adjusted in accordance with the seat adjustment signals,
  wherein the sensory perception comprises at least one of visual perception, auditive perception, tactile perception, olfactory perception and gustatory perception.

* * * * *